United States Patent
Moriwaki et al.

(10) Patent No.: US 6,637,303 B2
(45) Date of Patent: Oct. 28, 2003

(54) ELLIPTICAL VIBRATION CUTTING METHOD AND ELLIPTICAL VIBRATION CUTTING APPARATUS

(76) Inventors: Toshimichi Moriwaki, 1-50-301, Nishiochiai 6-chome, Suma-ku, Kobe-shi, Hyogo (JP); Eiji Shamoto, 5-4-204, Nikawakita 1-chome, Takarazuka-shi, Hyogo (JP); Makoto Matsuo, c/o Towa Corporation, 5, Kamitoba Kamichoshi-cho, Minami-ku, Kyoto-shi, Kyoto (JP)

( * ) Notice: Subject to any disclaimer, the term of this patent is extended or adjusted under 35 U.S.C. 154(b) by 200 days.

(21) Appl. No.: 09/818,330

(22) Filed: Mar. 27, 2001

(65) Prior Publication Data

US 2002/0152851 A1 Oct. 24, 2002

Related U.S. Application Data

(63) Continuation-in-part of application No. 09/373,497, filed on Aug. 12, 1999, now abandoned.

(30) Foreign Application Priority Data

Aug. 12, 1998 (JP) ............................................. 10-242525

(51) Int. Cl.$^7$ ........................... B23B 37/00; B23B 29/00
(52) U.S. Cl. .............................. 82/1.4; 82/161; 82/173; 82/904
(58) Field of Search ................ 82/1.11, 1.3, 1.5, 82/1.4, 71, 79, 161, 163, 173, 904; 83/956; 408/6, 11, 143, 700; 409/141

(56) References Cited

U.S. PATENT DOCUMENTS

| | | | |
|---|---|---|---|
| 4,911,044 A | * 3/1990 | Mishiro et al. | ................ 82/158 |
| 5,448,128 A | * 9/1995 | Endo et al. | ............ 310/323.12 |
| 5,548,176 A | * 8/1996 | Oda | ........................ 310/323.12 |
| 5,760,527 A | * 6/1998 | Ashizawa | .................... 310/317 |

FOREIGN PATENT DOCUMENTS

| | | | | |
|---|---|---|---|---|
| FR | 2178367 | | 11/1973 | |
| JP | 64-77484 A | * | 3/1989 | |
| JP | 02164285 A | * | 6/1990 | .......... H02N/02/00 |
| JP | 3-86087 A | * | 4/1991 | |

OTHER PUBLICATIONS

"Development of Tool Vibration System for Ultrasonic Elliptical Vibration Cutting Tool", the Japan Society for Precision Engineering, 1998 KANSAI Area Annual Coference Jul. 31 and Aug. 1, 1998.*

"Development of Tool Vibration System for Ultrasonic Elliptical Vibration Cutting Tool", Proceedings of 1997 Autumn Conferenc of the Japan Society for Precision Engineering, Oct. 1–3, 1997.*

"Ultraprecision Diamond Cutting of Die Steel by Applying Ultrasonic Elliptical Vibration Cutting", International Conference and Exhibition on Design and Production of Dies and Molds Conference Proceedings, Jun. 19–21, 1997, by E. Shamoto et al., PP: 105–110.*

C. I. R. P. Annalen. vol. 10, No. 3, 1961, p. 398 XP002155184, Figs. 2, 3.

* cited by examiner

*Primary Examiner*—Henry W. H. Tsai
(74) *Attorney, Agent, or Firm*—W. F. Fasse; W. G. Fasse

(57) ABSTRACT

A workpiece is cut by a cutting tool that is attached to a cylindrical support body vibrated by at least two piezoelectric drive elements. The efficiency of the mechanical vibration is improved by attaching the piezoelectric drive elements to a cylindrical body portion (7,7.1,7.2) of the tool support body (2) and by providing the support body with a plurality of necked-down end sections. At least the cylindrical body portion (7,7.1,7.2) is a cylinder with a substantially circular cross-section or with a circular cross-section to provide a constant or a substantially constant bending rigidity of the cylindrical tool support body.

12 Claims, 10 Drawing Sheets

LOCUS OF ELLIPTICAL VIBRATION

RELATION BETWEEN SPEED RATIO AND CUTTING RESISTANCE

LOCUS OF ELLIPTICAL VIBRATION

FREQUENCY:20.295kHz, VOLTAGE:200V
AMPLITUDE:13.432 μm, VELOCITY:51.4m/min (except C1 and C2)

FREQUENCY:20.314kHz, VOLTAGE:200V
AMPLITUDE:16.928 μm, VELOCITY:64.8m/min

FREQUENCY:20.407kHz, VOLTAGE:200V
AMPLITUDE:15.916 μm, VELOCITY:61.2m/min

ELLIPTICAL VIBRATION CUTTING METHOD AND ELLIPTICAL VIBRATION CUTTING APPARATUS

CROSS-REFERENCE TO RELATED APPLICATION

This application is a Continuation-In-Part Application of U.S. Ser. No. 09/373,497, filed Aug. 12, 1999 Now ABN.

BACKGROUND OF THE INVENTION

1. Field of the Invention

The present invention relates to improvements of an elliptical vibration cutting method and an elliptical vibration cutting apparatus which elliptically vibrates a cutting tool relative to a workpiece such as a steel product.

2. Description of the Prior Art

In general, a workpiece such as a steel product is cut by a conventional cutting method for providing the workpiece with a required shape.

Conventionally, a cutting tool is advanced relative to the workpiece in a constant direction, thereby cutting the workpiece by a prescribed chip removal.

Conventional cutting encounters the problem of frictional resistance or cutting resistance by the workpiece relative to the tool. This cutting resistance has a tendency to increase as the tool advances, thereby increasing the chip thickness which results in an inferior machinability.

When a ferrous material such as a steel product is cut with a diamond tool for ultraprecision working, the diamond tool is constantly in contact with the ferrous material, whereby frictional heat is generated in the contact area between the tool and the workpiece resulting in high-temperature, high-pressure working conditions. Further, carbon is dispersed in the ferrous material of the workpiece due to the chemical affinity between the diamond tool that is a form of carbon and the ferrous material. Thus, the diamond tool is subject to wear which prevents working the ferrous material with ultraprecise cutting with a diamond tool.

Elliptical vibration cutting with an elliptical vibration cutting apparatus 51 as shown in FIGS. 8, 9 and 10 is also known.

The cutting apparatus 51 performs an intermittent cutting for reducing the resistance thereby also reducing the heat conduction to the cutting tool. The intermittent cutting provides a cooling time for the cutting tool, thereby enabling an ultraprecise cutting of a ferrous material with a diamond tool.

The apparatus 51 shown in FIGS. 8 and 9 includes a cutting tool 53 cutting a workpiece 52 such as a steel product, an elliptical vibrator 54 elliptically vibrating the cutting tool 53, support members 55A and 55B supporting the elliptical vibrator 54, and a base 56 for mounting the support members 55a and 55b. The elliptical vibrator 54 includes a prismatic vibrator support body 57 forming a central portion of the elliptical vibrator 54. The body 57 has an axial projection 58 at one end and an axial projection 58A at the opposite end. Compared to the vertical dimension of the body 57, the projections 58 and 58A have reduced vertical dimensions to provide a stepped configuration. One of the projections 58 has a mounting surface 64 for mounting the cutting tool 53.

The apparatus 51 further includes piezoelectric elements 61 and 62 for generating elliptical or so-called flexible vibrations in the elliptical vibrator 54 and a control mechanism 63 individually applying prescribed sinusoidal voltages to the piezoelectric elements 61 and 62 for driving the vibrator body 57. Horizontal surfaces 59 and vertical surfaces 60 on the side surfaces of the prismatic body 57 define plane mounting surfaces for the piezoelectric elements 61 and 62.

The control mechanism 63 individually applies sinusoidal voltages of the same frequency which are 90 degrees out of phase, for example to the piezoelectric elements 61 mounted on the horizontal surfaces 59 and to the piezoelectric elements 62 mounted on the vertical surfaces 60 for energizing the piezoelectric elements, thereby generating flexible vibrations in the elliptical vibrator 54 in two perpendicular directions (vertical and horizontal directions in FIG. 9). The support members 55A and 55B form supporting points for the vibration of the body 57. The elliptical vibrator 54 is elliptically vibrated by energizing the piezoelectric elements which generate an elliptical vibration of the elliptical vibrator 54, whereby the cutting edge of the cutting tool 53 mounted on the mounting surface 64 moves along an elliptical path or "locus".

Thus, the apparatus 51 can perform an elliptical vibration cutting operation on the workpiece 52 with the cutting tool 53. In other words, the apparatus 51 converts electrical energy to mechanical energy when a sinusoidal voltage is applied to the piezoelectric elements to generate a flexible elliptical vibration through the elliptical vibrator 54.

Referring to FIG. 8, there are three loops of vibration in the spacing M between the support members 55A and 55B.

When performing an elliptical vibration cutting on the aforementioned ferrous material with a diamond tool the cutting resistance and the heat conduction to the cutting tool are reduced due to the intermittent cutting operation which provides a cooling time for the cutting tool between periods when the ferrous material is engaged by the tool and ultraprecise working with the diamond tool becomes possible.

When the elliptical vibrator 54 is flexibly elliptically vibrated, however, corner portions of the prismatic body 57 remarkably impede or hinder the two-directional flexible vibration, whereby the elliptical tool path is distorted. The impeding of the vibrations results in a respective energy loss in the elliptical vibrator 54 which makes it difficult to obtain a desired locus or tool path caused by the elliptical vibration.

With the elliptical vibrator 54 having the prismatic vibrator support body 57, therefore, the elliptical vibration path of the cutting tool 53 cannot be enlarged, disadvantageously leading to an inferior machinability of the workpiece 52 cut with the cutting tool 53.

In other words, electrical energy cannot be efficiently converted to mechanical energy with the elliptical vibrator 54 having a prismatic vibrator support body 57. In FIG. 8 the body 57 has a square cross-section.

SUMMARY OF THE INVENTION

Accordingly, it is an object of the present invention in a vibration cutting apparatus having an elliptical vibrator, to enlarge a locus or path of elliptical vibration of a cutting tool that is elliptically vibrated by the elliptical vibrator to thereby improve the machinability of a workpiece cut with the cutting tool.

Another object of the present invention is to provide an elliptical vibration cutting apparatus capable of efficiently converting electrical energy to mechanical energy and to efficiently perform elliptical vibration cutting operations on a workpiece with an increased tool vibration amplitude.

Another object of the invention is to construct the vibrator, more specifically a cylindrical body portion of a tool support body forming the vibrator, in such a way that the geometric moment of inertia of the cylindrical body portion is constant or at least substantially constant for 360° around a central longitudinal axis of the cylindrical body portion carrying at least two piezoelectric drive elements. A constant or substantially constant moment of inertia is achieved according to the invention by providing the cylindrical body portion with a circular cross-section or with a substantially cylindrical cross-section.

The term "substantially constant" as used in this context to qualify the geometric moment of inertia is intended to cover any geometric moment of inertia that is distinguished from a moment of inertia of a conventional tool carrier body having an octagonal cross-section. A curve tracing the size of a conventional geometric moment of inertia of a tool carrier body with an octagonal cross-section in a polar coordinate system is also octagonal, because the moment of inertia is largest in a corner of the octagon and smallest centrally between two corners. This pattern is repeated around the octagon. Contrary thereto, the respective curve of the geometric moment of inertia of the cylindrical body portion with a substantially circular cross-section according to the invention, is also substantially circular and hence substantially constant.

The cylindrical body portion has a "substantially circular cross-section" if it has one flattened surface area for each piezoelectric drive element and curved or arcuate surface areas circumferentially between the flattened surfaces areas. The curved or arcuate surface areas are curved or arcuate radially inwardly relative to a central longitudinal axis of the cylindrical body portion of the tool support body.

In order to solve the aforementioned technical problems, an elliptical vibration cutting method according to the present invention employs an elliptical vibrator elliptically vibrating a cutting tool for cutting a workpiece.

According to one aspect of the present cutting method, the impedance or hindrance exerted on the elliptical vibration of the elliptical vibrator by an octagonal tool support body, is reduced thereby enlarging the locus or path amplitude of the elliptical vibration of the cutting edge of the cutting tool. Preferably, the vibrator or tool support body is provided with a curved outer peripheral circumferential surface for reducing the amount of hindrance caused by a square or octagonal cross-sectional configuration. In other words, the cornered edges of the support body are removed according to the invention.

According to another aspect of the present method, the diameter of the axial projections is reduced relative to the diameter of the support body, thereby also enlarging the locus or path amplitude of the elliptical vibration on the cutting edge of the cutting tool.

According to still another aspect of the present method, the elliptical vibration is tracked and detected to provide a precise control signal which is used to control and stabilize the locus or path of the elliptical vibration applied to the cutting edge of the cutting tool.

An elliptical vibration cutting apparatus according to the present invention comprises an elliptical vibrator as a tool support body for elliptically vibrating a cutting tool for cutting a workpiece, wherein the tool support body has a cylindrical central body portion with a curved circumferential surface at least between piezoelectric elements for reducing the above mentioned hindrance of the elliptical vibration in the elliptical vibrator to thereby enlarge a locus or path of the elliptical vibration cutting edge of the cutting tool. The curved circumferential surface may be formed on at least a portion of the outer peripheral surface of a cylindrical body forming the elliptical vibrator support body. Reduced diameter projections extending coaxially to the central axis of the support body and from each end of the support body have one or more reduced diameters compared to the diameter of the central support body, whereby a stepped down support body configuration is formed. This stepped down configuration also amplifies the elliptical vibration.

The elliptical vibration cutting apparatus of the invention preferably comprises a tracking mechanism for tracking the elliptical vibration and a feedback circuit for precisely controlling the elliptical vibration in response to the tracking and in accordance with the required cutting precision.

Further, the vibration cutting apparatus according to the invention comprises supporting members supporting the elliptical vibrator support body in positions where a node of vibration is located.

Thus, electrical energy applied through a sinusoidal voltage is more efficiently converted to mechanical energy in the form of elliptical vibrations as compared to the prior art.

The amount of interference exerted on or resistance to the elliptical vibration can be reduced to readily obtain a desired locus, whereby two-directional flexible vibrations can be independently (individually) feedback-controlled when the elliptical vibrator having the cylindrical support body is elliptically vibrated.

DESCRIPTION OF THE PREFERRED EMBODIMENT

An embodiment of the present invention will now be described in detail with reference to the accompanying drawings. The term "cylindrical" as used herein refers to a cylindrical tool support body 2 that has a substantially circular cross-section as in FIG. 2 or a circular cross-section as in FIGS. 14 and 16.

Figure 1:
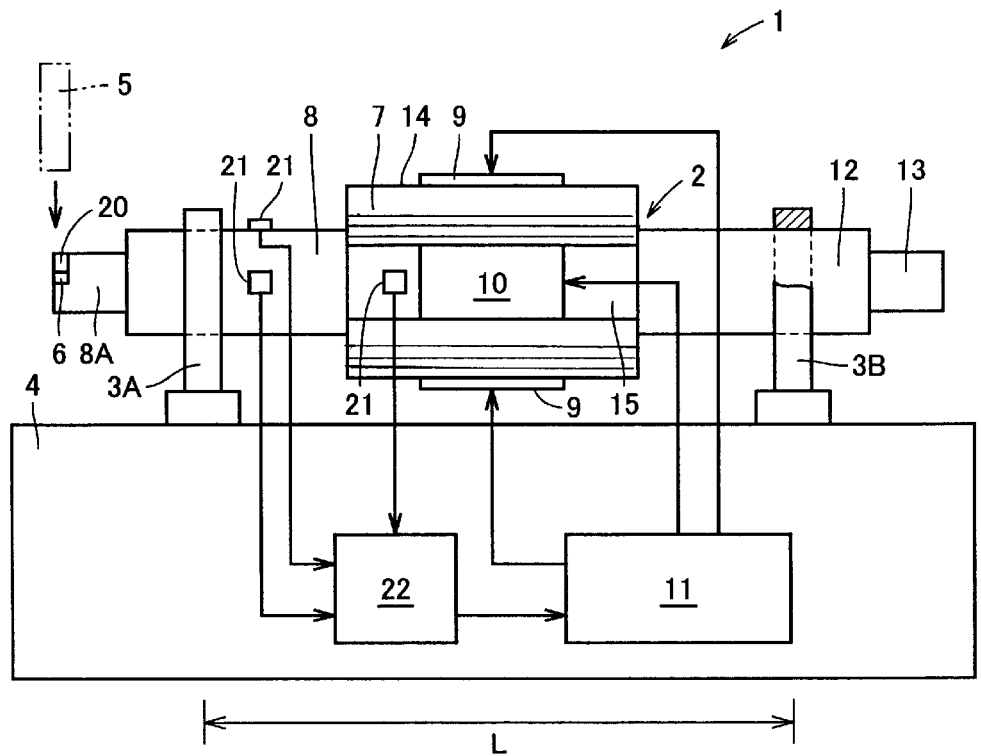
FIG. 1 is a schematic front elevational view showing an elliptical vibration cutting apparatus according to the present invention.
Figure 2:
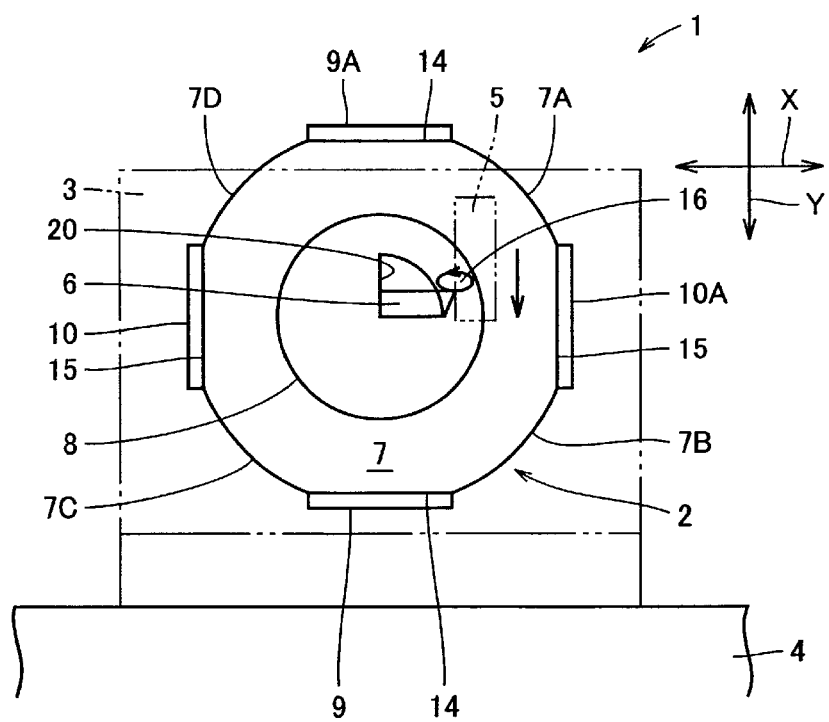
FIG. 2 is an end elevational view schematically showing a side of the apparatus shown in FIG. 1.

The elliptical vibration cutting apparatus 1 according to the invention shown in FIGS. 1 and 2 has a cutting tool 6 for cutting a workpiece 5 such as a steel product. An elliptical vibrator comprises the tool support body 2 for elliptically vibrating the cutting edge of the cutting tool 6. The body 2 is mounted on support members 3A and 3B supporting the elliptical vibrator and support body 2 on a base 4 which holds the support members 3A and 3B. A mounting surface 20 for securing the cutting tool 6 is provided on an end of the support body 2.

As shown in FIGS. 1 and 2, the support body 2 according to the invention is a cylindrical body with several different diameters. A central cylindrical body portion 7 of the support body 2 has the largest first diameter and a curved outer peripheral circumferential surface. The cylindrical body portion 7 has a substantially circular cross-section which provides the curved or arcuate outer peripheral circumferential surface to which piezoelectric drive elements 9, 9A, 10, 10A are attached. At least two, preferably four, such drive elements are attached to flattened surface areas 14, 15 of the circumferential surface of the body portion 7. Due to these flattened areas 14, 15 the cross-section is referred to as "substantially circular". Two first supporting sections 8 and 12 extend coaxially from opposite ends of the central section 7 relative to a central longitudinal axis A of the tool support body 2. The first support sections 8 and 12 have a second diameter smaller than said first diameter of the body portion 7. The first support sections 8 and 12 rest on the support members 3A and 3B, respectively. Two second tool carrier sections 8A and 13 having a third still smaller diameter extend coaxially from the first support sections 8, 13.

As best seen in FIGS. 1 and 2 the mounting surface 20 provided on the cylindrical smallest diameter section 8A carries the tool 6.

As shown in FIG. 1, the first supporting sections 8 and 12 have an intermediate or second diameter. These sections 8, 12 pass individually through or rest on the support members 3A and 3B, so that the elliptical vibrator body 2 is supported. Reference character L denotes a longitudinal on-center spacing between the support members 3A and 3B.

As mentioned above, the cylindrical body portion 7 of the vibrator support body 2 carries a required number, four are shown in FIGS. 1 and 2, of piezoelectric drive elements 9, 9A and 10, 10A for generating an elliptical vibration in the elliptical vibrator support body 2. The flattened surface areas 14 extend horizontally. The flattened surface areas 15 extend vertically and are preferably provided on the side surface of the cylindrical central body portion 7 having the substantially circular cross-section. The flattened surface areas 14 and 15 extend perpendicularly relative to each other for mounting the piezoelectric elements 9, 9A and 10, 10A. The surface areas 14 extend in parallel with each other and register vertically with each other. The surface areas 15 extend in parallel with each other and register horizontally with each other.

The piezoelectric elements 9, 9A are mounted on the horizontal surfaces 14, while the piezoelectric elements 10, 10A are mounted on the vertical surfaces 15, as shown in FIGS. 1 and 2. According to the invention curved or arcuate peripheral surface areas 7A, 7B, 7C, 7D are provided between the flattened surface areas 14, 15 to form the body portion 7 with a substantially circular cross-section. The center of curvature of the peripheral surface areas 7A, 7B, 7C and 7D is located on a central longitudinal axis CA of the elliptical vibrator body 2.

In order to drive the piezoelectric elements 9, 9A and 10, 10A a control and power supply 11 is provided for individually applying prescribed sinusoidal voltages to the piezoelectric elements 9, 9A and 10, 10A to energize and control the same. An elliptical vibration or flexible vibration is generated in the vibrator and tool support body 2 by individually driving the piezoelectric elements 9, 9A and 10, 10A through the control and power supply 11. The control and power supply 11 individually applies sinusoidal voltages having prescribed frequencies, prescribed amplitudes and prescribed phases, namely a prescribed phase difference, to the piezoelectric elements 9, 9A and 10, 10A.

In the apparatus 1, the vibrator or tool support body 2, the piezoelectric elements 9, 9A and 10, 10A, the control, and power supply 11 and the support members 3A and 3B form an elliptical vibration unit for elliptically vibrating the cutting tool 6. When the control and power supply 11 energizes the piezoelectric elements 9, 9A provided on the horizontal surfaces 14 a flexible vibration is generated in the elliptical vibrator and tool support body 2 in the Y-direction or vertical direction, whereby the support members 3A and 3B form respective supporting points. Energizing the piezoelectric elements 10, 10A on the vertical surfaces 15 with a sinusoidal voltage having a prescribed phase different of 90 degrees, for example, relative to that applied to the piezoelectric elements 9, 9A generates a flexible vibration in the elliptical vibrator and tool support body 2 along the horizontal X-direction, whereby the support members 3A and 3B also form respective supporting points (see FIG. 2).

Thus, an elliptical vibration is imposed on the tool mounting surface 20 by the elliptical vibrator through tool support body 2. The vibration is a composite flexible vibration because the vibration caused by the piezoelectric elements 9, 9A is superimposed on the vibration caused by the piezoelectric elements 10, 10A. The composite vibration of the elliptical vibrator and tool support body 2 is transmitted to the cutting tool 6, so that the cutting edge of the cutting tool 6 is elliptically vibrated while following a path or locus 16 (see FIG. 4) of elliptical vibration, whereby the cutting edge of the cutting tool 6 is rotated along the locus 16 of elliptical vibration.

The force flexibly vibrating the elliptical vibrator and tool support body 2 as generated by the piezoelectric elements 9, 9A and 10, 10A is proportionate to the area size of the flattened mounting surface areas 14, 15 of the piezoelectric elements 9, 9A, 10, 10A. When the area size of the mounting areas of the piezoelectric elements 9, 9A and 10, 10A is increased, it follows that the force that flexibly vibrates the tool support body 2 is also increased.

The positions of the support members 3A and 3B define nodes of the flexible vibration generated in the tool support body 2 at the supporting points, while the cutting tool 6 on its mounting surface 20 is positioned where a peak of the flexible vibration occurs, for example.

Figure 3:
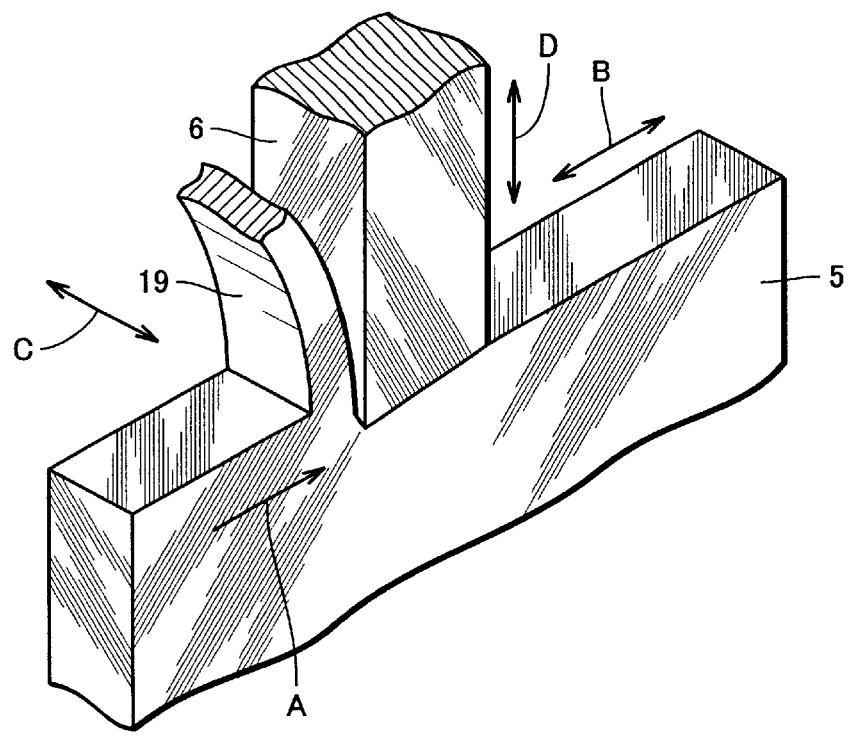
FIG. 3 is an explanatory perspective diagram for illustrating vibrational directions of a cutting tool in the elliptical vibration cutting apparatus according to the present invention.

As shown in FIG. 3, the workpiece 5 is moved in a cutting direction A at a prescribed cutting speed (m/min.), so that the workpiece 5 can be cut with the cutting tool 6. The cutting tool 6 follows three vibrational directions including a cutting force direction B corresponding to the cutting direction A, a feed force direction C and a thrust force direction D.

Figure 4:
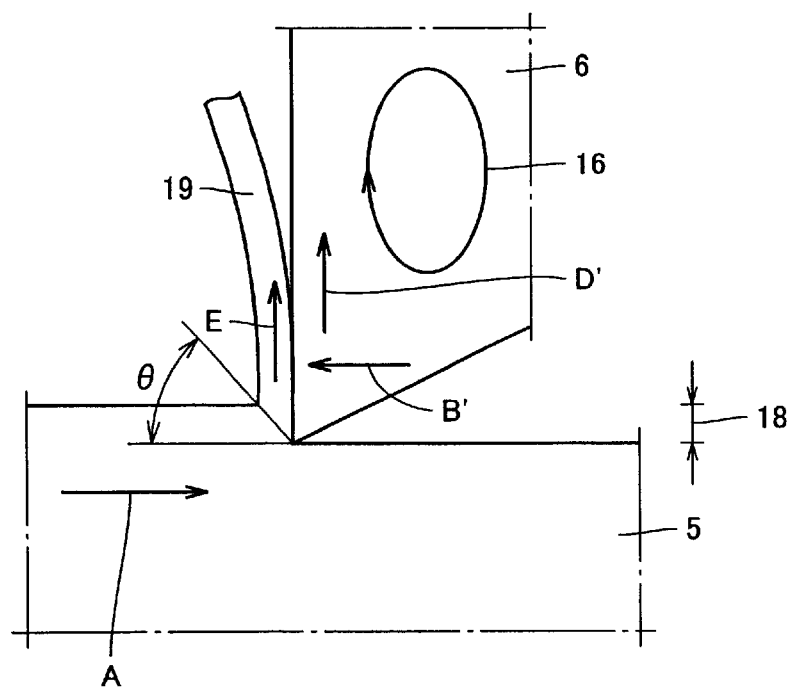
FIG. 4 is an explanatory diagram for illustrating a cutting principle in the case of generating elliptical vibrations in the cutting tool of the elliptical vibration cutting apparatus according to the present invention.

FIG. 4 shows that the forward cutting tip of the cutting tool 6 is elliptically vibrated whereby the tool moves along a locus or path 16 of a periodic elliptical vibration generated in the elliptical vibrator and tool support body 2 by the piezoelectric elements. Thus, the cutting tool 6 cuts a chip 19 off the workpiece 5 in a prescribed undeformed chip thickness 18. The elliptical vibration of the cutting tool 6 has speed components in the cutting force direction B and in the thrust force direction D.

With reference to FIG. 4, the elliptical vibration cutting for cutting the workpiece in the prescribed undeformed chip thickness 18 with the cutting tool 6 will now be described. The cutting tool 6 first cuts the workpiece 5 in the cutting force direction B', leftward in FIG. 4, along the locus 16 of elliptical vibration. The tool is temporarily separated from the workpiece 5 in the thrust force direction D', upwardly in FIG. 4.

At this time, the chip 19 cut off the workpiece 5 is pulled up by the cutting tool 6 in the thrust force direction D', whereby the chip is moved out in a chip flow direction E. In this way, the frictional resistance is reduced or inverted to a negative frictional resistance. Thus, the cutting resistance of the workpiece 5 against the cutting tool 6 is reduced, thereby also reducing the cutting force of the cutting tool 6 to improve the machinability. Then, the cutting tool 6 is separated from the chip 19 by moving to the right in FIG. 4 and moved again toward the workpiece 5 by moving down in the thrust force direction opposite to D'. Thus, elliptical vibration cutting is performed on the workpiece 5 by periodically vibrating the cutting tool 6 along the locus 16 of elliptical vibration which will be described in more detail below.

The aforementioned cutting by elliptical vibration has the following advantages: the thickness of the chip 19 is reduced, the cutting resistance is reduced, a mirror-like finishing even of hardened steel is achieved, the life of the cutting tool 6 is increased, the machining accuracy is improved, flashes are suppressed, chattering is prevented, and the cutting heat is reduced all as compared to conventional cutting.

Assuming that the undeformed chip thickness 18 of the chip 19 cut out from the workpiece 5 is constant or the same as in conventional cutting, the amount of the portion cut and removed from the workpiece 5 per unit time is increased as the locus or path 16 of elliptical vibration is enlarged according to the invention. The magnitude of the locus 16 of elliptical vibration is expressed by the vibration speed based on movement length along the locus 16 of elliptical vibration in one minute (m/min.). The ratio of the vibration speed to the cutting speed is referred to as a speed ratio (vibration speed/cutting speed).

Referring further to FIG. 4, symbol θ denotes a shear angle. The shear angle θ is an index of the machinability of the workpiece 5 cut with the cutting tool 6. The machinability of the workpiece 5 is improved as the shear angle θ is increased.

In the elliptical vibration cutting apparatus 1 of the invention shown in FIGS. 1 and 2, the control and power supply 11 applies sinusoidal voltages having prescribed frequencies, prescribed phases and the like to the piezoelectric elements 9, 9A, and 10, 10A, whereby an elliptical vibration having a prescribed frequency (cycle) and a prescribed vibration speed is generated in the cutting tool 6. For example, an elliptical vibration cutting can be performed by setting the frequency of the elliptical vibration in an ultrasonic region. A frequency of at least 17 KHz, for example, is inaudible to human ears.

Figure 5:
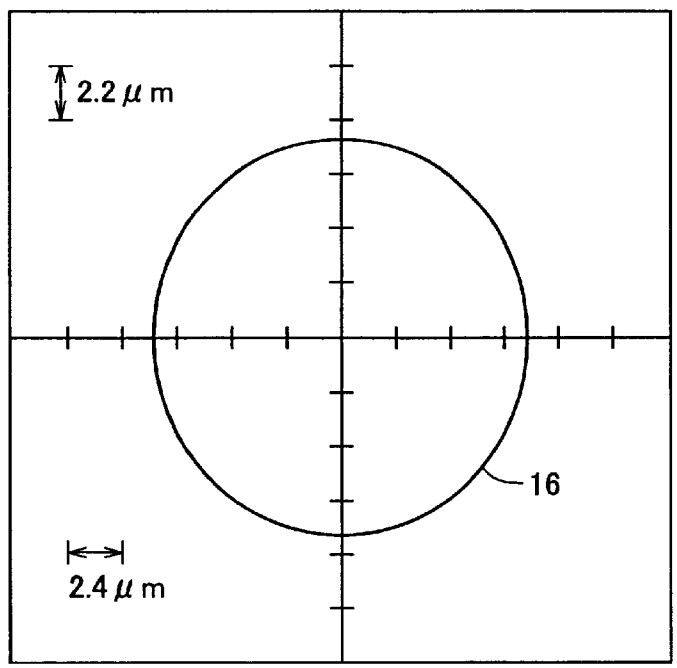
FIG. 5 illustrates a locus of elliptical vibration generated in the cutting tool of the apparatus shown in FIG. 1.
Figure 6:
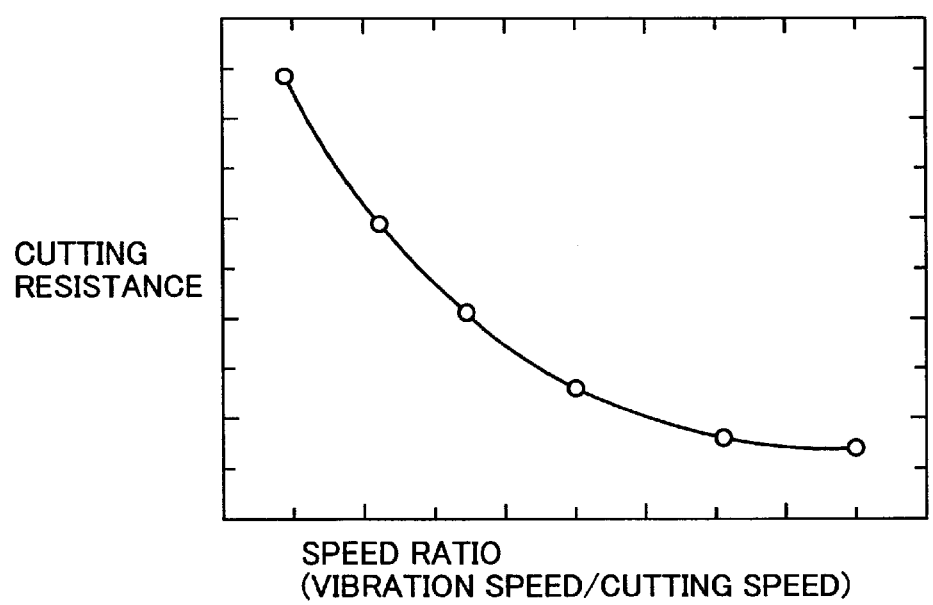
FIG. 6 illustrates the cutting resistance as a function of a speed ratio between the vibration speed and the cutting speed in an elliptical vibration cutting apparatus according to the invention.
Figure 7:
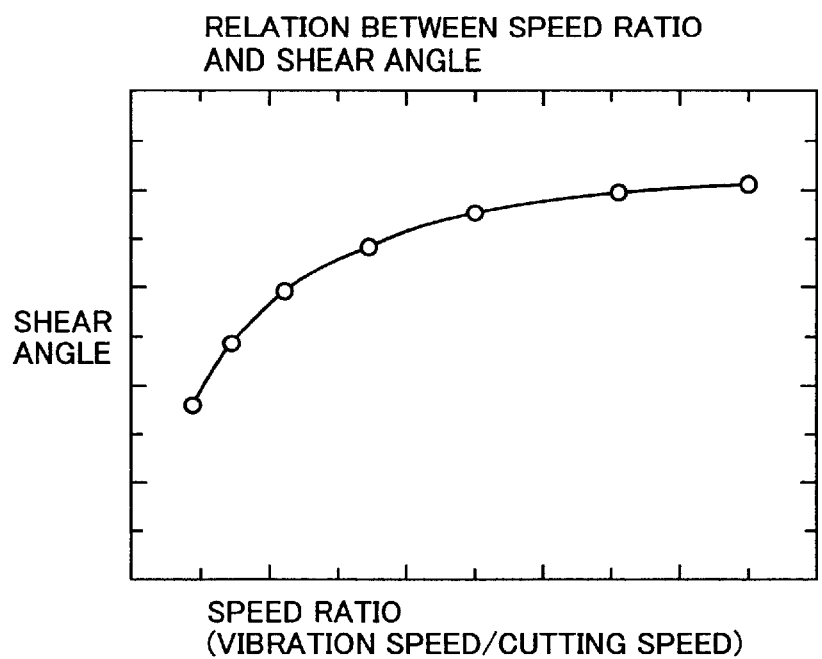
FIG. 7 illustrates the shear angle and the above mentioned speed ratio when performing elliptical vibration cutting with a cutting tool in the apparatus according to the present invention.

FIGS. 5 to 7 show results of elliptical vibration cutting by the apparatus 1 according to the present invention shown in FIGS. 1 and 2. FIG. 10 shows the result of elliptical vibration cutting by the conventional apparatus 51 shown in FIGS. 8 and 9.

Figure 8:
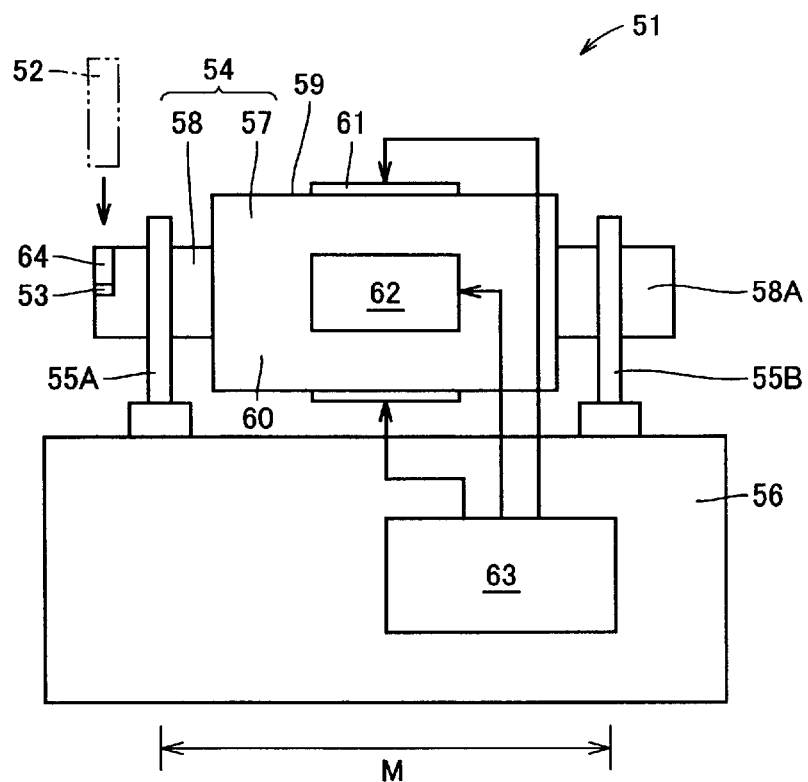
FIG. 8 is a schematic front elevational view showing a conventional elliptical vibration cutting apparatus.
Figure 9:
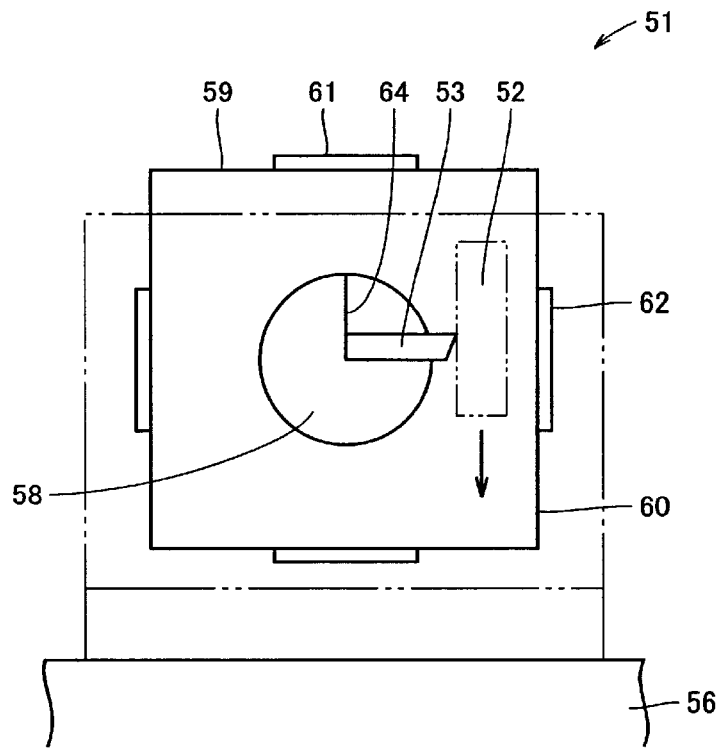
FIG. 9 is a schematic end elevational view showing a side of the apparatus shown in FIG. 8.
Figure 10:
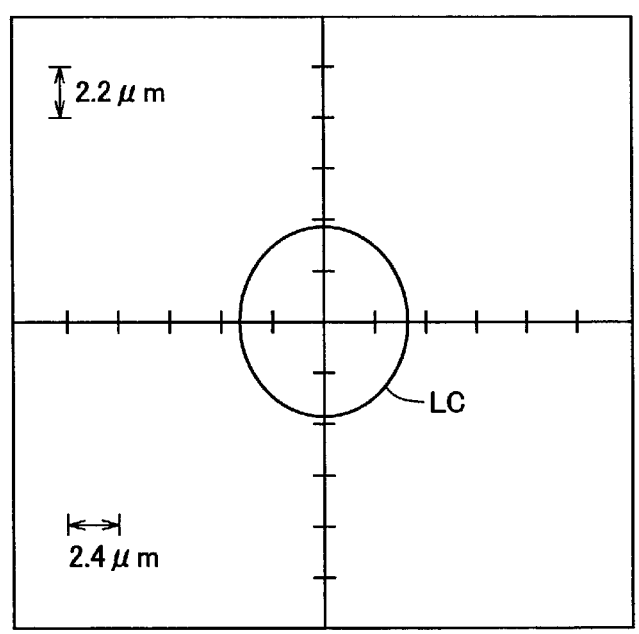
FIG. 10 illustrates a locus of elliptical vibration generated in a cutting tool in the apparatus shown in FIG. 8.

Referring to FIGS. 5, 6, 7 and 10, it is assumed that the frequency of the elliptical vibration in the cutting tool is about 20 KHz, the sinusoidal voltages input in the piezoelectric elements are 200 V, and the mounting areas of the piezoelectric elements 9, 9A and 10, 10A employed in the present apparatus 1 are identical to those of the piezoelectric elements 61 and 62 employed in the conventional apparatus 51 shown in FIGS. 8 and 9. The piezoelectric elements 9, 9A, 10, 10A, 61 and 62 are of the PZT type.

FIG. 5 shows the locus 16 of the elliptical vibration and corresponding tool motion of the present apparatus 1 of the present invention. FIG. 10 shows a locus LC of the elliptical vibration in a conventional apparatus 51 shown in FIGS. 8 and 9. More specifically, the present tool support body 2 or at least its central body portion 7 has a substantially circular cross-section whereas the cross-section of the conventional tool 51 is square as shown in FIG. 9.

The locus 16 according to the present invention shown in FIG. 5 is larger than the respective conventional locus LC shown in FIG. 10 even though the same input voltages of 200 V is applied to the piezoelectric elements in both instances. The vibration speed in the present invention is 60 m/min., i.e. about twice that of about 30 m/min. in the prior art apparatus 51 with a square cross-section of its central portion carrying the piezoelectric elements.

Figure 14:
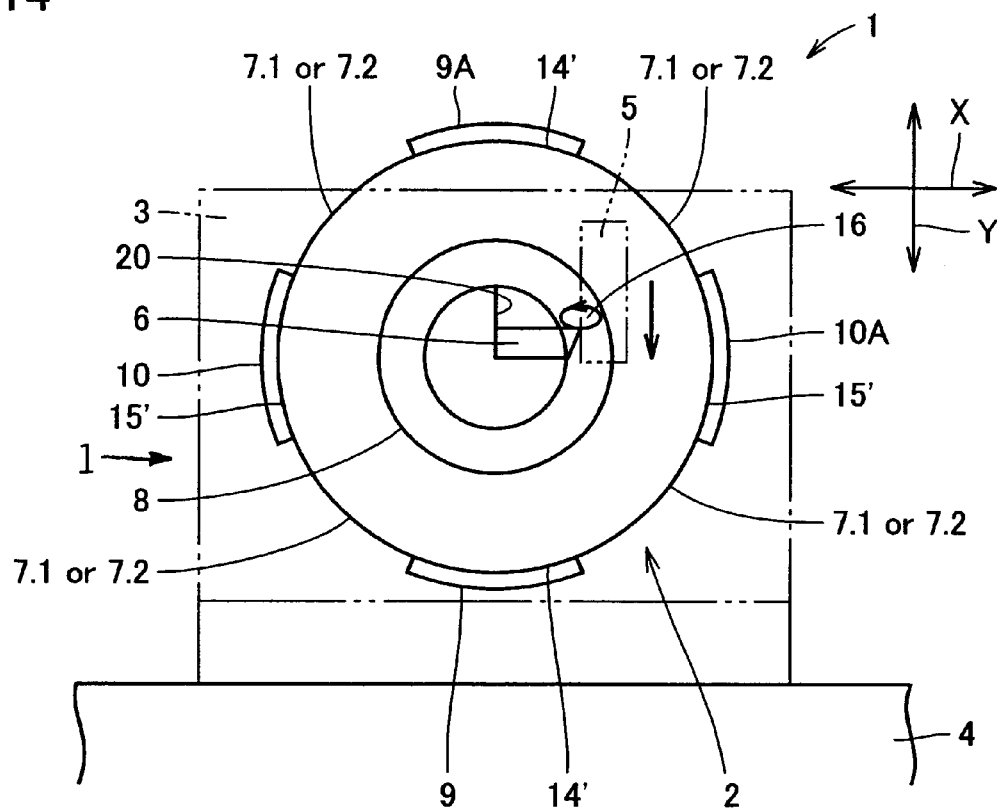
FIG. 14 shows an end view of a cutting apparatus according to the invention similar to that of FIG. 1, however, provided with a cylindrical body portion having a circular cross-section and carrying correspondingly curved or arcuate piezoelectric drive elements.

Thus, the amount of vibration impedance can be reduced in an elliptical, flexible vibration tool support body 2 if the body 2 has the central cylindrical body portion 7 with a substantially circular cross-section as shown in FIGS. 1 and 2 or with a circular cross-section as shown in FIG. 14 to be described below. The reduction of the vibration resistance or impedance reduces heat generation during the cutting which in turn reduces energy losses, thereby increasing the cutting efficiency. Thus, the locus 16 of elliptical vibration followed by the cutting tool 6 is enlarged and the machinability of the workpiece 5 cut with the cutting tool 6 according to the invention is improved compared to the prior art.

If the locus or path 16 of the elliptical vibration is enlarged according to the invention, the vibration speed is increased whereby the cutting speed is also increased. As a result the amount of chip removal per unit of time is respectively increased.

According to the invention, electrical energy is more efficiently converted to mechanical energy as compared to the conventional apparatus 51. The foregoing advantages are achieved by the present apparatus 1 having the elliptical vibrator tool support body 2 including the cylindrical body portion 7 with a circularly curved peripheral surface due to the circular or substantially circular cross-section of the body portion 7.

When performing elliptical vibration cutting on a ferrous material with a diamond tool, the elliptical vibration cutting is intermittently performed. Therefore, heat conduction to the cutting tool is reduced during times when the tool 6 is disengaged from the workpiece 5 for efficiently reducing heat generated during times when the tool 6, such as a diamond cutting tip, is in contact with the ferrous material, while carbon is prevented from diffusing into the ferrous material and the wear of the diamond tool is efficiently reduced. Therefore, the elliptical vibration cutting apparatus 1 shown in FIGS. 1 and 2 can ultraprecisely cut ferrous material with a diamond tool tip 6.

The elliptical vibration cutting apparatus 1 with the elliptical vibrator tool support body 2 including the cylindrical body portion 7 with four curved circular cross-section surface portions or with a substantially circular cross-section, or with a cylindrical surface of a cylinder with a circular cross-section, enlarges the flexible, elliptical vibration locus 16 whereby the distance between nodes of vibration are also increased. Therefore, an on-center spacing L between the support members 3A and 3B at the positions of the nodes of vibration is also larger than the distance M between the support members 55A and 55B of the conventional apparatus 51 (L>M).

While the vibration in the conventional apparatus 51 has three loops within the distance M, five loops of vibration can be provided within the spacing L by employing the support members 3A and 3B as supporting points at the nodes of vibration.

The construction shown in FIG. 1 with the necked-down sections 8 and 8A at one end of the central, cylindrical body portion 7 of substantially circular cross-section and with the necked-down sections 12 and 13 at the other end of the body portion 7, facilitates the enlargement of the locus 16 of the elliptical vibration when the piezoelectric elements 9, 10, 9A, 10A are energized. More than two necked-down sections may be provided at each end of the central body portion 7 with the curved surfaces to form a multi-step configuration. The vibration of the entire support body 2 becomes more efficient the more necked-down sections the support body 2 has, thereby facilitating the enlargement of the elliptical vibration locus 16. The necked-down sections 8, 8A, 12, 13 need not have a circular cross-section. However, such circular cross-sections of the necked-down sections are preferred. However, it is important that the central portion 7 has a circular or substantially circular cross-section.

FIG. 6 shows the cutting resistance as a function of the speed ratio (vibration speed/cutting speed) for the cutting apparatus 1 shown in FIGS. 1 and 2. When keeping the cutting speed constant and increasing the vibration speed, the cutting resistance is reduced while the force pulling up the chip 19 cut from the workpiece 5 with the cutting tool 6 is increased and frictional resistance is reduced, see also FIG. 4.

FIG. 7 shows the shear angle θ (see FIG. 4) as a function of the speed ratio (vibration speed/cutting speed) for the apparatus 1 shown in FIGS. 1 and 2. The shear angle θ increases as the speed ratio is increased. When setting the cutting speed constant and increasing the vibration speed, for example, the shear angle θ is increased thereby discharging the chip 19 more effectively, whereby the machinability of the workpiece 5 cut with the cutting tool 6 is improved.

The mounting surface 20 for the cutting tool 6 may be provided on each of the smallest diameter sections 8A and 13.

Two or four piezoelectric drive elements may be used. FIG. 2 shows four piezoelectric elements 9, 9A, 10 and 10A. Two piezoelectric elements have the same function and effect as four such elements provided that the total mounting surface area of two elements is the same as the mounting surface area of four such elements. In both instances the piezoelectric elements will have a circumferential, angular on-center spacing of 90°.

When the elliptical vibration cutting apparatus 1 shown in FIGS. 1 and 2 is driven for elliptical vibration, working heat is generated in the cutting tool 6 and in the support body 2 by the cutting resistance. Thus, the cutting tool 6 may be deformed by a cutting load. Further, the vibrator tool support body 2 itself generates heat due to the application of the voltages to the piezoelectric elements 9 and 10; 9A, 10A. Further, the locus 16 of elliptical vibration of the cutting edge of the cutting tool 6 may vary with the temperature e.g. the room temperature of a working room where the apparatus 1 is used. Consequently, the vibration frequency, e.g., 20 KHz, the vibration amplitude and the phase, e.g., 90 degrees, of the elliptical vibrations generated in the apparatus 1 may become unstable.

In order to compensate for the above mentioned vibration destabilizing effects on the vibration characteristics such as the vibration frequency, amplitude and phase, the invention provides a positive, closed loop feedback control of the energizing voltage for the piezoelectric elements. For this purpose at least one sensor 21, preferably three sensors 21 positioned as shown in FIG. 1, provide feedback control signals to a feedback circuit 22 connected with its output to a central control and energizing device 11 which provides the power or energizing voltage to the piezoelectric elements. The feedback control stabilizes the vibration of the tool support body 2. The piezoelectric elements may be attached to the cylindrical surface of the tool support or to flattened surface areas 14, 15 of the otherwise cylindrical surface of the body portion 7. The locus of vibration is preferably elliptical but may be circular. In both instances the vibration locus is enlarged according to the invention. Magnetostrictive elements may be used as energizing means instead of piezoelectric elements.

Figure 11:
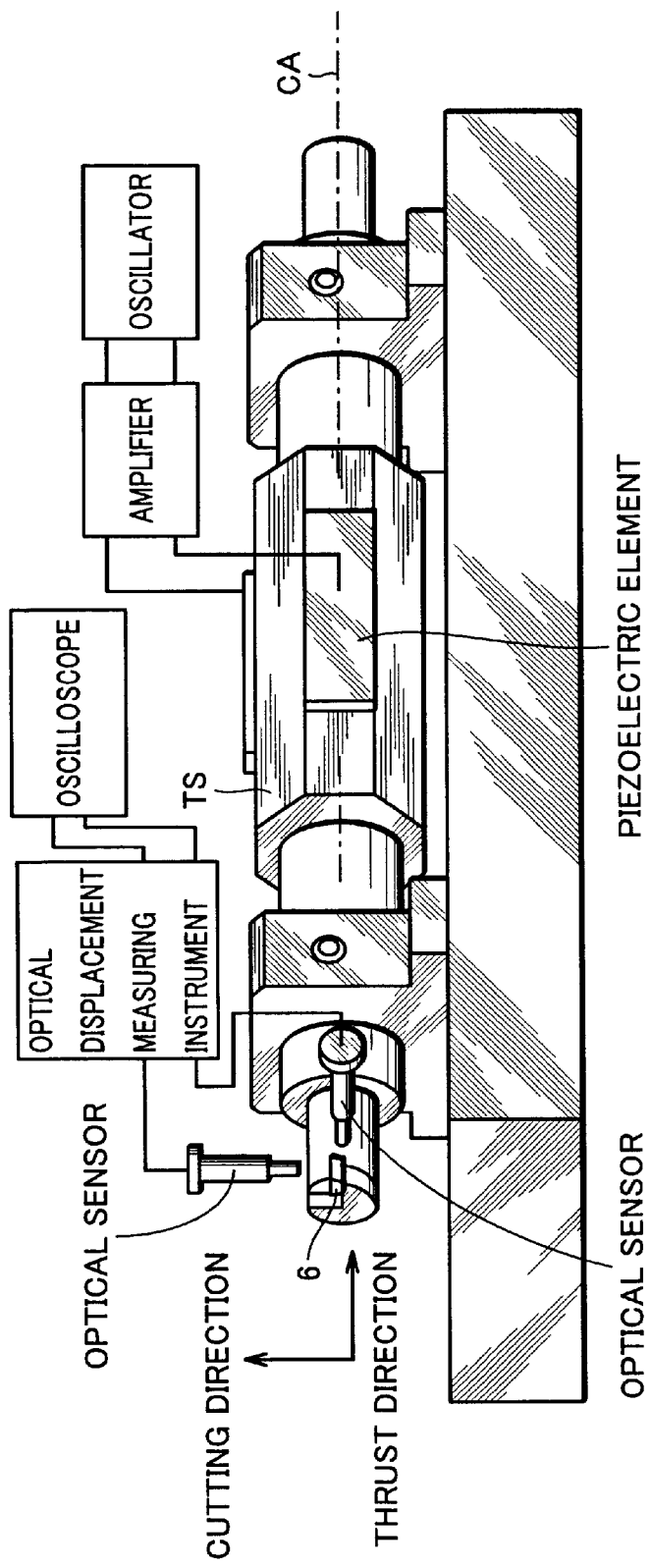
FIG. 11 shows schematically a conventional cutting apparatus adapted for measuring and recording on an oscilloscope the amplitude of the tool displacement.

FIG. 11 shows a cutting machine equipped with a conventional tool support TS having an octagonal cross-section and a central longitudinal axis CA. The machine is equipped with two optical sensors positioned at a 90° on-center spacing from each other for "viewing" or sensing the motions of the tool 6. The respective tool motion or tool displacement signals are supplied for processing in an optical displacement measuring instrument. The processed signals are displayed on an oscilloscope. Otherwise, FIG. 11 is self-explanatory.

Figure 12:
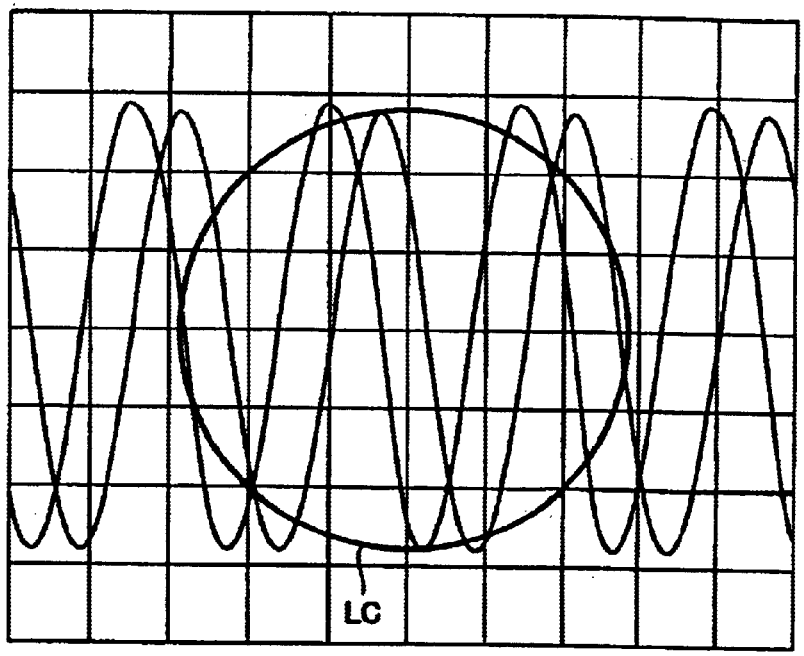
FIG. 12 shows a diagram of an oscilloscope image of the tool displacement as measured by the apparatus of FIG. 11 for a conventional tool support body having an octagonal cross-section.

FIG. 12 illustrates an oscilloscope image as displayed by the oscilloscope in FIG. 11 for the tool support TS with a conventional octagonal cross-section. In the test the tool 6 was driven through its tool support TS at a frequency of 20.295 kHz with a voltage of 200 V applied to the piezoelectric drive elements attached to two flat surfaces of the octagonal tool support TS. The measured tool displacement was 13.432 μm at a cutting or vibration velocity of 51.4 m/min. Each of the two optical sensors produced one of the two sinus waveforms shown in FIG. 12 representing the tool vibration. The central circle LC seen in FIG. 12 corresponds to the movement of the tool along an elliptical locus or track as seen in FIG. 10.

Figure 13:
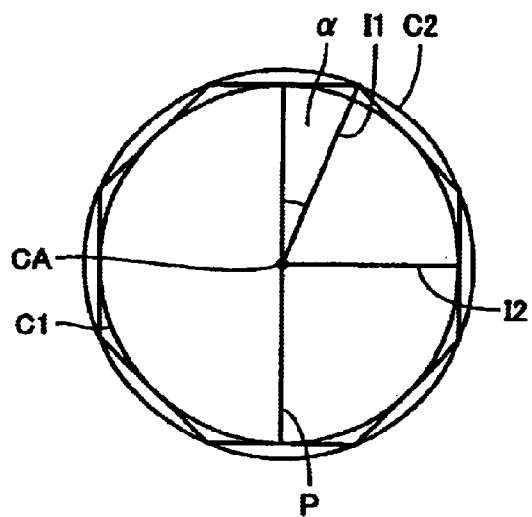
FIG. 13 shows two circles C1 and C2 and an intermediate octagonal cross-section of a conventional tool support body representing in a polar coordinate system, the varying geometric moment of inertia of the conventional tool support body.

FIG. 13 shows the octagonal cross-section of the conventional tool support TS of FIG. 11 and the geometric moment of inertia I of such a hexagonal tool support TS. The moment of inertia I varies between a high value I1 and a low value I2 repeatedly around the central longitudinal axis CA, also shown in FIG. 11, as the angle α varies starting with an axis or plane P vertically through the central axis CA of the tool support TS. The high value I1 exists in each corner of the octagonal cross-section. The low value I2 exists at the center of each flat surface of the octagonal cross-section of the tool support TS.

The bending strength or rigidity of the octagonal tool support TS is the product of the variable geometric moment of inertia I×E (Young's modulus). As the inertia moment varies, so does the bending strength around the center of the octagonal tool support TS. The inventors have discovered that such a variable bending rigidity adversely affects the cutting efficiency and in fact prevents obtaining an optimal cutting efficiency.

Figure 16:
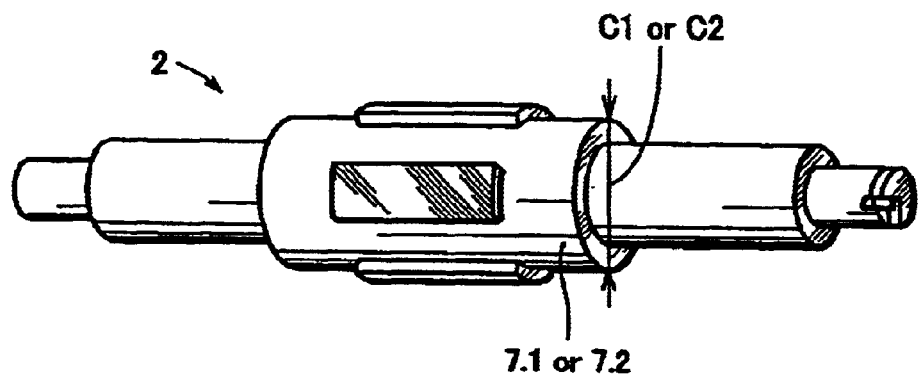
FIG. 16 shows a tool support body with a central cylindrical body portion having a circular cross-section with the diameter of either the circle C1 or of the circle C2 used in the apparatus of FIG. 11 for measuring the tool displacement amplitude as illustrated in FIG. 17.

To solve this problem the invention teaches to use a tool support body 2 with a cylindrical body portion 7 that has a substantially circular cross-section as in FIG. 2 or a cylindrical body portion 7.1 or 7.2 that has a circular cross-section as in FIGS. 14 and 16. Such a tool support body 7, 7.1 or 7.2 has a substantially constant or a constant geometric moment of inertia Ic and hence a substantially constant or a constant bending strength or rigidity in all circumferential directions.

FIG. 13 also shows an outer circle C2 that has a radius defined by the corners of the octagonal cross-section. An inner circle C1 has a radius defined by the flat sides of the octagon extending tangentially to the inner circle. These circles C1 and C2, as far as they represent cross-sections of cylindrical tool support bodies according to the invention, are not part of the prior art. Tests were made with cylindrical tool support body portions 7.1 and 7.2 having radii corresponding to C1 and C2 as will be described below.

FIG. 14 shows an embodiment of the invention substantially identical to that of FIGS. 1 and 2 except that in FIG. 14 the cylindrical tool support body portion 7.1 or 7.2 has a circular cross-section and the piezoelectric drive elements 9, 9A; 10, 10A have an arcuate or curved configuration that matches the circular peripheral surface configuration 14', 15' of the cylindrical body portion 7.1 or 7.2. Flattened areas are not provided in the embodiment of FIG. 14.

Figure 15:
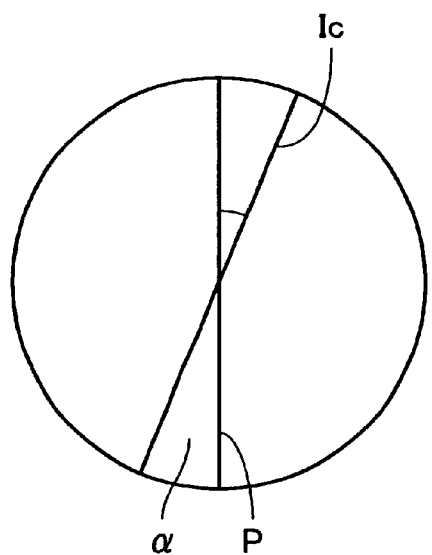
FIG. 15 is a diagram illustrating a constant geometric moment of inertia of the cylindrical body portion that has a fully circular cross-section according to the invention.

FIG. 15 shows that the geometric moment of inertia I of the cylindrical tool support body portion 7.1 or 7.2 is constant, all around 360°. For the embodiment of FIGS. 1 and 2 the geometric moment of inertia is substantially constant. The moment of inertia merely becomes insignificantly smaller along the flattened areas 14, 15 in FIG. 2.

FIG. 16 shows the cylindrical tool support body 2 with a central body portion having a circular cross-section for testing the improvements achieved by the invention. The central body portion of the tool support body 2 has two reference numbers 7.1 and 7.2 because two tool support bodies with different diameters of the central portion 7.1 or 7.2 were tested. Referring to FIG. 13 the first central body portion 7.1 had a diameter equal to the diameter of the inner circle C1. The straight lines of the octagonal cross-section are tangents to the inner circle C1. The second central body portion 7.2 had a diameter equal to the diameter of the outer circle C2. The corners of the octagonal cross-section touch the outer circle C2. These diameters of the central body portions 7.1 and 7.2 have been selected to have a basis of comparison with a conventional tool support body TS having a central portion with an octagonal cross-section dimensioned to fit between the inner circle C1 and the outer circle C2. All three samples were tested in the apparatus of FIG. 11. The results are shown in FIG. 12 for the conventional body with the octagonal cross-section, in FIG. 17 for the body portion 7.1 according to the invention and in FIG. 18 for the body portion 7.2 according to the invention. The testing conditions were the same in all three instances, namely an energizing voltage of 200 volts at a frequency of about 20 kHz for energizing the piezo-electric drive elements.

Figure 17:
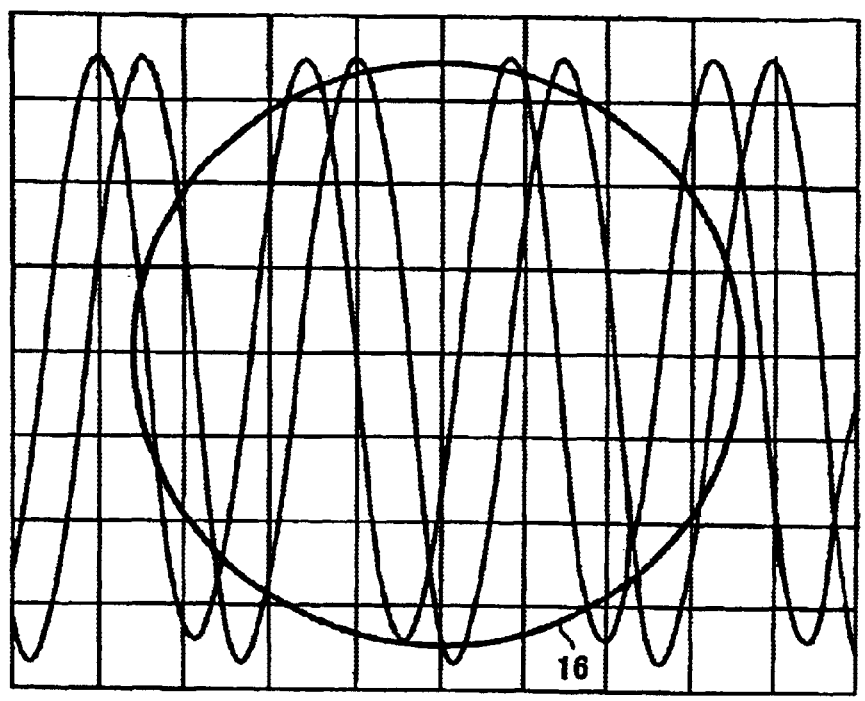
FIG. 17 shows an oscilloscope image, as in FIG. 12, but illustrating the improvement in the tool displacement amplitude according to the invention with a central body portion 7.1 having the diameter of the circle C1.

Referring to an oscilloscope image of FIG. 17, a tool displacement amplitude of 16.928 μm and a cutting velocity of 64.8 m/min were measured for the tool support body portion 7.1 of FIG. 16 with its diameter corresponding to the diameter of the circular cross-section of the inner circle C1. As in FIG. 5, the tool motion path or track is shown at 16 and the curves illustrate the tool vibration. Taking the results shown in FIG. 12 for the octagonal body TS to be 100%, the invention achieves a 26% improvement in the vibration velocity and in the tool displacement amplitude of the cutting tool. (16.928:13.432=1.26)

Figure 18:
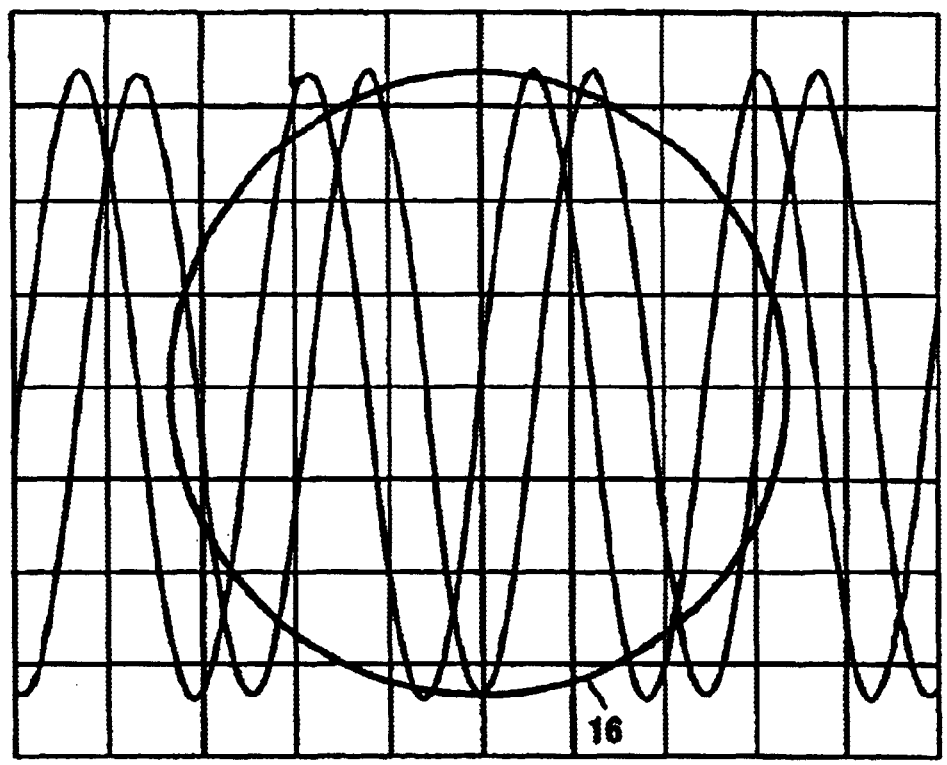
FIG. 18 shows the oscilloscope image of the test results for a central body portion 7.2 having a diameter of the circle C2.

Referring to FIG. 18, an identical test was made for a cylindrical tool support body with a central portion 7.2 having a circular cross-section according to the invention with a diameter corresponding to the diameter of the outer circle C2 shown in FIG. 13. The testing conditions were the same as for FIGS. 12 and 17. Minor deviations in the oscillating frequency of the drive oscillator for the piezoelectric drive elements are due to frequency drift and are not significant to the measured results. These test results for the tool support body portion 7.2 having a diameter corresponding to that of the outer circle C2 showed a tool displacement amplitude of 15.916 μm and a vibration velocity of 61.2 m/min., which is still an unexpected improvement of about 18.5% compared to the results shown in FIG. 12 (15.916:13.432=1.1849). The tool motion path or track in FIG. 17 is also shown at 16 and the curves illustrate the tool vibration.

The improved tool vibration amplitudes and tool velocity or cutting speeds shown in FIGS. 17 and 18, compared to FIG. 12, are substantial and show that a circular cross-section or at least a substantially circular cross-section for the central body portion 7, 7.1, 7.2 is critical for achieving the advantages of the invention. This criticality is particularly clear and unexpected from FIG. 18. The results of FIG. 18 are based on a central body portion 7.2 having the diameter of the outer circle C2 and therefore a cross-sectional area larger than the cross-sectional area of the conventional octagonal body TS. Hence the flexural rigidity of the body portion 7.2 is larger than the respective flexural rigidity of the octagonal body TS. It would follow that the test results of FIG. 18 should be lower than those of FIG. 12. Yet, surprisingly the test results of FIG. 18 are better by almost 19% compared to the results of FIG. 12.

Although the invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for cutting a workpiece by vibratory action, said apparatus comprising a vibratory tool support body (2) having a cylindrical body portion (7,7.1,7.2) with a circular or substantially circular cross-section wherein said cylindrical body portion (7,7.1,7.2) comprises a circumferential, peripheral surface forming a cylinder that has said circular or substantially circular cross-section, at least two piezoelectric drive elements including a first and a second piezoelectric drive element (9, 10) secured to said cylindrical body portion (7,7.1,7.2) of said vibratory tool support body (2) with a 90° angular on-center circumferential spacing between said at least first and second piezoelectric drive elements (9, 10), a mounting surface (20) for securing a tool (6) to one end of said vibratory tool support body, and means (11) for energizing said at least first and second piezoelectric drive elements for vibrating said vibratory tool support body (2) by a vibration having an elliptical or circular locus, wherein said cylindrical body portion (7,7.1,7.2) of said vibratory tool support body (2) has a first diameter and a central longitudinal axis, said vibratory tool support body (2) further comprising at least one first body section (8 or 12) extending from said cylindrical body portion (7,7.1,7.2) coaxially relative to said central longitudinal axis, said at least one first body section having a second diameter smaller than said first diameter to provide a first stepped or necked-down configuration for amplifying said vibratory action, and at least one second body section (8A or 13) extending from said at least one first body section (8 or 12) coaxially relative to said central longitudinal axis, said at least one second body section (8A or 13) having a third diameter smaller than said second diameter to provide a second stepped or necked-down configuration, and wherein said mounting surface (20) is positioned at an outer end of one of said at least one second body section (8A), said apparatus further comprising at least two sensors (21) positioned circumferentially spaced around and secured to said at least one first body section (8) between said cylindrical body portion (7,7.1,7.2) and said at least one second body section (8A) to which said tool (6) is secured.

2. The apparatus of claim 1, further comprising a feedback circuit (22) having inputs connected to said at least two sensors (21) and an output connected to an input of said means (11) for energizing said piezoelectric drive elements (9, 9A, 10, 10A) in response to output signals from said at least two sensors (21).

3. The apparatus of claim 1, comprising three sensors (21) including a first sensor attached to said cylindrical central body portion (7,7.1,7.2) and second and third sensors attached circumferentially spaced relative to one of said at least one first body section (8) between said cylindrical central body portion and said at least one second body section (8A) to which said tool (6) is secured.

4. The apparatus of claim 1, further comprising a first support member (3A) and a second support member (3B) for supporting said vibratory tool support body (2), wherein said first and second support members (3A, 3B) are spaced from each other by an on-center spacing (L) which corresponds to a spacing between vibration nodes of said vibratory tool support body (2).

5. The apparatus of claim 4, comprising two first body sections (8 and 12), and wherein said first and second support members (3A, 3B) support said first body sections (8 and 12) having a second diameter smaller than said first diameter.

6. The apparatus of claim 1, wherein said cylindrical body portion comprises four circumferentially spaced peripheral surface sections, said apparatus further comprising four piezoelectric drive elements (9, 9A; 10, 10A) secured to said peripheral surface sections of said cylindrical body portion (7,7.1,7.2) having said circular or substantially circular cross-section, with said angular on-center spacing of 90° between neighboring piezoelectric drive elements.

7. The apparatus of claim 1, wherein said cylindrical body portion (7,7.1,7.2) of said vibratory tool support body (2) has a circular cross-section and a geometric moment of inertia (Ic) which is constant for 360° around said central longitudinal axis of said vibratory tool support body (2).

8. The apparatus of claim 7, wherein said at least first and second piezoelectric drive elements have a radially inwardly curved surface matching said circumferential peripheral surface of said cylindrical body portion (7,7.1,7.2) having said circular cross-section.

9. The apparatus of claim 7, comprising four piezoelectric drive elements (9, 9A'; 10', 10A') each having a radially inwardly curved surface matching said circumferential, peripheral surface of said cylindrical body portion (7,7.1, 7.2) having said circular cross-section.

10. The apparatus of claim 1, wherein said cylindrical body portion (7) of said vibratory tool support body (2) has a substantially circular cross-section and a substantially constant geometric moment of inertia (I) for 360° around a central longitudinal axis of said circular cross-section.

11. The apparatus of claim 10, wherein said cylindrical body portion (7) comprises at least two flattened areas (14,15) in said circumferential, peripheral surface whereby said cross-section is substantially circular, said first piezoelectric drive element being secured to one of said at least two flattened areas, said second piezoelectric drive element being secured to the other flattened area of said at least two flattened areas.

12. The apparatus of claim 11, wherein each of said at least two flattened areas has a surface area size just sufficient for the mounting of the respective piezoelectric drive element.

* * * * *

UNITED STATES PATENT AND TRADEMARK OFFICE
CERTIFICATE OF CORRECTION

PATENT NO.    : 6,637,303 B2
DATED         : October 28, 2003
INVENTOR(S)   : Moriwaki et al.

It is certified that error appears in the above-identified patent and that said Letters Patent is hereby corrected as shown below:

Title page,
Item [*] Notice, delete the phrase "by 200 days" and insert -- by 0 days --

Signed and Sealed this

Fifth Day of April, 2005

JON W. DUDAS
*Director of the United States Patent and Trademark Office*